US012633862B2

(12) United States Patent
Wang et al.

(10) Patent No.:   US 12,633,862 B2
(45) Date of Patent:     May 19, 2026

(54) MOTOR OVERLOAD PROTECTION METHOD, MOTOR CONTROLLER, VEHICLE, AND STORAGE MEDIUM

(71) Applicant: BYD COMPANY LIMITED, Guangdong (CN)

(72) Inventors: Chunsheng Wang, Shenzhen (CN); Boliang Xu, Shenzhen (CN); Wei Xiong, Shenzhen (CN); Tao Qin, Shenzhen (CN); An Cao, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 223 days.

(21) Appl. No.: 18/524,070

(22) Filed: Nov. 30, 2023

(65) Prior Publication Data

US 2024/0097599 A1      Mar. 21, 2024

Related U.S. Application Data

(63) Continuation of application No. PCT/CN2022/099001, filed on Jun. 15, 2022.

(30) Foreign Application Priority Data

Sep. 29, 2021    (CN) .......................... 202111152401.5

(51) Int. Cl.
*H02P 29/032*      (2016.01)
*H02P 29/028*      (2016.01)

(52) U.S. Cl.
CPC ................................. *H02P 29/032* (2016.02)

(58) Field of Classification Search
CPC ..... H02P 29/032; H02P 29/027; H02P 29/028
See application file for complete search history.

(56) References Cited

U.S. PATENT DOCUMENTS 4,858,053 A      8/1989   Profio
7,259,533 B2 *   8/2007   Yang ....................... H02P 29/02
                                                           318/434

(Continued)

FOREIGN PATENT DOCUMENTS

CN          101777754 A      7/2010
CN          102810850 A   * 12/2012

(Continued)

OTHER PUBLICATIONS

International Search Report and Written Opinion for Application No. PCT/CN2022/099001, mailed on Aug. 29, 2022, 9 pages.

(Continued)

*Primary Examiner* — Thai T Dinh

(74) *Attorney, Agent, or Firm* — Sheppard Mullin Richter & Hampton LLP

(57)      ABSTRACT

A method for protecting a motor from overloading includes: acquiring a present effective value of a phase current of a motor; performing time integration on the present effective value of the phase current, to obtain a first integral value; obtaining a first threshold; performing overload detection according to the first threshold and the first integral value; determining a target limiting current for operation of the motor if an overload occurs; and controlling the operation of the motor based on the target limiting current.

19 Claims, 4 Drawing Sheets

(56) References Cited

U.S. PATENT DOCUMENTS

| | | | | |
|---|---|---|---|---|
| 9,484,848 | B2 * | 11/2016 | Kitagawa | H02P 29/032 |
| 11,031,892 | B2 * | 6/2021 | Park | H02P 21/14 |
| 11,451,183 | B2 * | 9/2022 | Park | H02P 21/50 |
| 2006/0119302 | A1 * | 6/2006 | Yang | H02P 29/02 |
| | | | | 318/434 |
| 2008/0025304 | A1 | 1/2008 | Venkataswami et al. | |

FOREIGN PATENT DOCUMENTS

| | | | | |
|---|---|---|---|---|
| CN | 103795032 | A | * | 5/2014 |
| CN | 102810850 | B | | 8/2015 |
| CN | 104836205 | A | | 8/2015 |
| CN | 109560746 | B | | 9/2020 |
| EP | 0540417 | A1 | | 5/1993 |
| EP | 2207041 | A1 | | 7/2010 |
| JP | H09149546 | A | | 6/1997 |
| JP | 2013-240192 | A | | 11/2013 |
| JP | 2015-104235 | A | | 6/2015 |

OTHER PUBLICATIONS

Huang et al., "Technology and Application of Avoiding Locked Rotor Fault of HV Switchgear Electric Chassis", High Voltage Apparatus, Mar. 2018, vol. 54, No. 3, pp. 205-211.

* cited by examiner

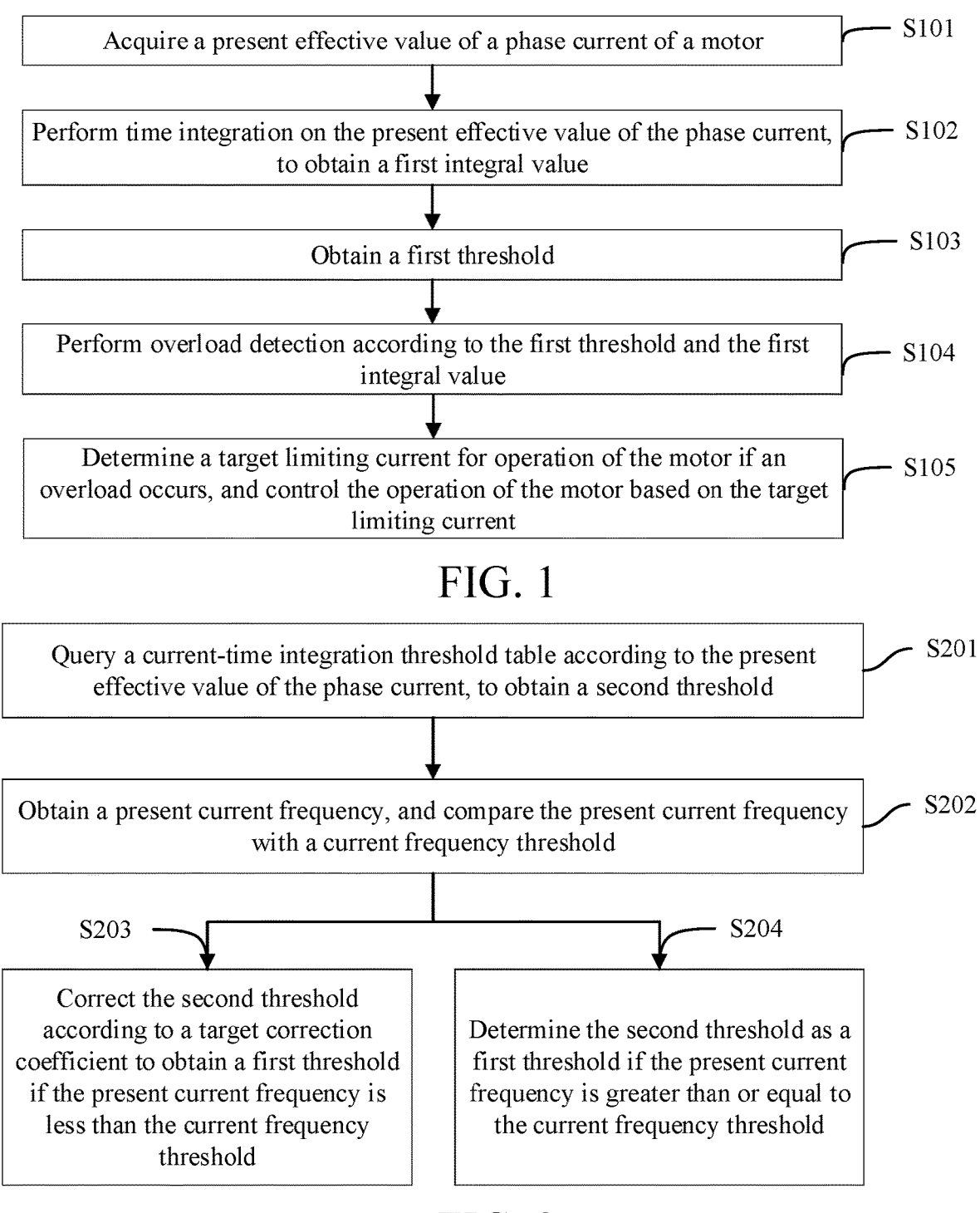

Acquire a present effective value of a phase current of a motor — S101

Perform time integration on the present effective value of the phase current, to obtain a first integral value — S102

Obtain a first threshold — S103

Perform overload detection according to the first threshold and the first integral value — S104

Determine a target limiting current for operation of the motor if an overload occurs, and control the operation of the motor based on the target limiting current — S105

FIG. 1

Query a current-time integration threshold table according to the present effective value of the phase current, to obtain a second threshold — S201

Obtain a present current frequency, and compare the present current frequency with a current frequency threshold — S202

S203 — Correct the second threshold according to a target correction coefficient to obtain a first threshold if the present current frequency is less than the current frequency threshold S204 — Determine the second threshold as a first threshold if the present current frequency is greater than or equal to the current frequency threshold

FIG. 2

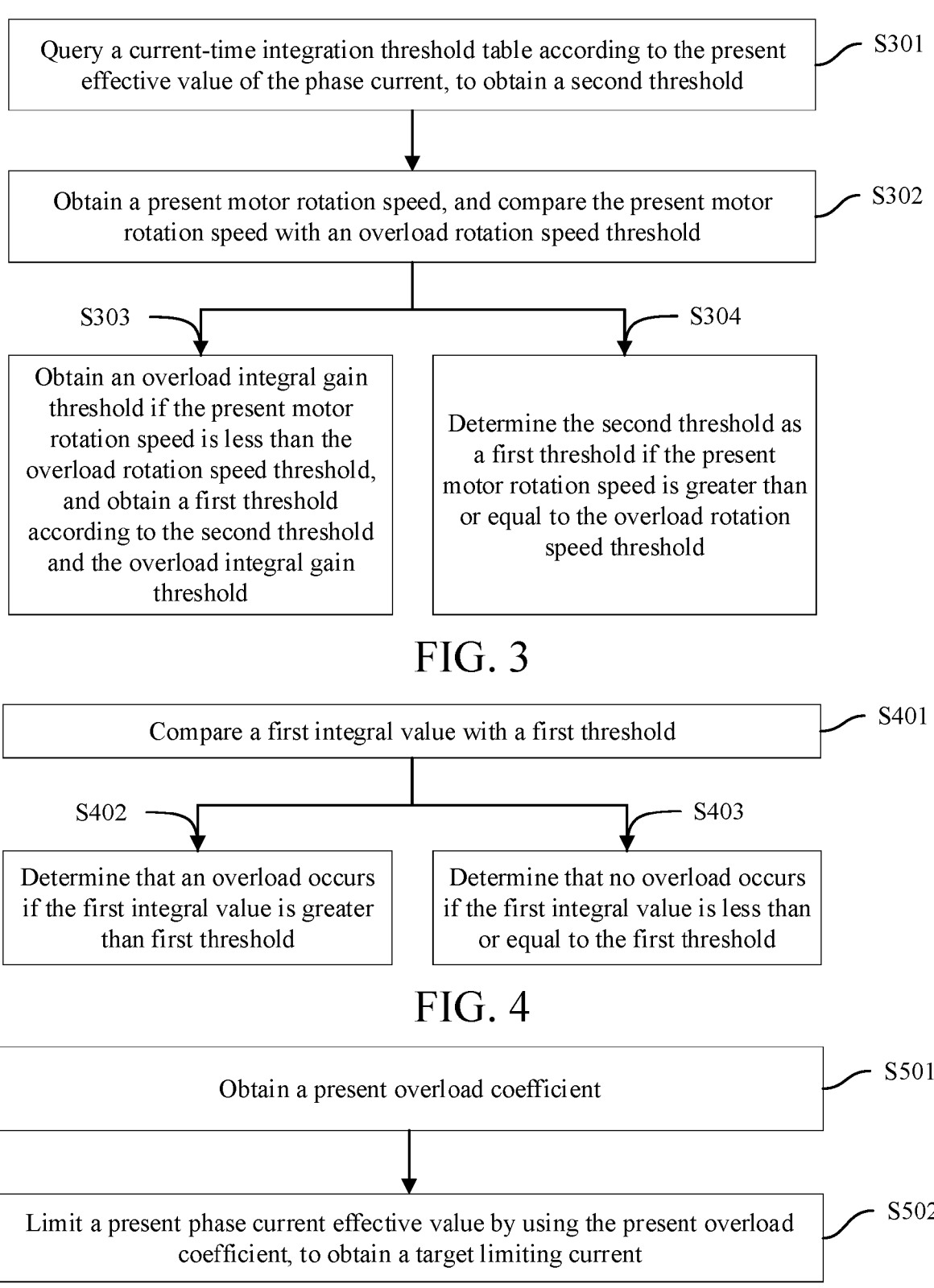

Query a current-time integration threshold table according to the present effective value of the phase current, to obtain a second threshold — S301

Obtain a present motor rotation speed, and compare the present motor rotation speed with an overload rotation speed threshold — S302

S303 —

Obtain an overload integral gain threshold if the present motor rotation speed is less than the overload rotation speed threshold, and obtain a first threshold according to the second threshold and the overload integral gain threshold

S304

Determine the second threshold as a first threshold if the present motor rotation speed is greater than or equal to the overload rotation speed threshold

FIG. 3

Compare a first integral value with a first threshold — S401

S402 —

Determine that an overload occurs if the first integral value is greater than first threshold

S403

Determine that no overload occurs if the first integral value is less than or equal to the first threshold

FIG. 4

Obtain a present overload coefficient — S501

Limit a present phase current effective value by using the present overload coefficient, to obtain a target limiting current — S502

FIG. 5

MOTOR OVERLOAD PROTECTION METHOD, MOTOR CONTROLLER, VEHICLE, AND STORAGE MEDIUM

CROSS-REFERENCE TO RELATED APPLICATIONS

This is a Continuation application of International Patent Application No. PCT/CN2022/099001, filed on Jun. 15, 2022, which is based on and claims priority to and benefits of Chinese Patent Application No. 202111152401.5, filed on Sep. 29, 2021. The entire content of all of the above-referenced applications is incorporated herein by reference.

FIELD

The present disclosure relates to a motor overload protection method, a motor controller, a vehicle, and a storage medium.

BACKGROUND

An existing motor overload protection solution for a motor driving system of a vehicle generally includes one of the following two solutions. A first solution is to determine whether overload protection is required by detecting whether an actual temperature of the motor driving system reaches a temperature limit. A second solution is to monitor power flowing to a motor and implement overload protection according to the power.

SUMMARY

The present disclosure provides a motor overload protection method, a motor controller, a vehicle, and a storage medium.

A motor overload protection method includes:

acquiring a present effective value of a phase current of a motor;

performing time integration on the present effective value of the phase current, to obtain a first integral value;

obtaining a first threshold;

performing overload detection according to the first threshold and the first integral value; and determining a target limiting current for operation of the motor if an overload occurs, and controlling the operation of the motor based on the target limiting current.

According to an embodiment of the present disclosure, the obtaining a first threshold includes:

querying a current-time integration threshold table according to the present effective value of the phase current, to obtain a second threshold;

obtaining a present current frequency, and comparing the present current frequency with a current frequency threshold;

correcting the second threshold according to a target correction coefficient to obtain the first threshold if the present current frequency is less than the current frequency threshold; and determining the second threshold as the first threshold if the present current frequency is greater than or equal to the current frequency threshold.

According to an embodiment of the present disclosure, the correcting the second threshold according to a target correction coefficient to obtain the first threshold includes:

processing the second threshold by a threshold correction formula and with the target correction coefficient, to obtain the first threshold;

wherein the threshold correction formula is $V1=K*V2$, V1 is the first threshold, V2 is the second threshold, and K is the target correction coefficient.

According to an embodiment of the present disclosure, the obtaining a first threshold includes:

querying a current-time integration threshold table according to the present effective value of the phase current, to obtain a second threshold;

obtaining a present motor rotation speed, and comparing the present motor rotation speed with an overload rotation speed threshold;

obtaining an overload integral gain threshold if the present motor rotation speed is less than the overload rotation speed threshold, and obtaining the first threshold according to the second threshold and the overload integral gain threshold; and determining the second threshold as the first threshold if the present motor rotation speed is greater than or equal to the overload rotation speed threshold.

According to an embodiment of the present disclosure, before the querying a current-time integration threshold table according to the present effective value of the phase current, to obtain a second threshold, the motor overload protection method further includes:

obtaining a test output current and target operation duration corresponding to the test output current;

determining a rated parameter corresponding to the test output current based on a constant and the target operation duration;

performing time integration on the rated parameter, to obtain a rated threshold corresponding to the test output current; and forming the current-time integration threshold table based on the test output current, the target operation duration, the rated parameter, and the rated threshold.

According to an embodiment of the present disclosure, the performing overload detection according to the first threshold and the first integral value includes:

comparing the first integral value with the first threshold;

determining that an overload occurs if the first integral value is greater than the first threshold; and determining that no overload occurs if the first integral value is less than or equal to the first threshold.

According to an embodiment of the present disclosure, the determining a target limiting current for operation of the motor includes:

obtaining a present overload coefficient; and limiting the present effective value of the phase current by using the present overload coefficient, to obtain the target limiting current.

According to an embodiment of the present disclosure, the limiting the present effective value of the phase current by using the present overload coefficient, to obtain the target limiting current includes:

calculating the present overload coefficient and the present effective value of the phase current by using a limiting current calculation formula, to obtain the target limiting current; and wherein the limiting current calculation formula is $It=(Ic*Kco)/R$, It is the target limiting current, Ic is the present effective value of the phase current, Kco is the present overload coefficient, and R is a constant.

According to an embodiment of the present disclosure, after the performing overload detection according to the first threshold and the first integral value, the motor overload protection method further includes:

obtaining a present overload coefficient;

obtaining an overload coefficient decrement step size if an overload occurs, and decrementing the present overload coefficient by using the overload coefficient decrement step size every other overload protection period, to obtain an updated overload coefficient;

obtaining an overload coefficient increment step size if no overload occurs, and incrementing the present overload coefficient by using the overload coefficient increment step size every other overload recovery period, to obtain an updated overload coefficient; and performing limit processing on the updated overload coefficient, to obtain an updated present overload coefficient.

According to an embodiment of the present disclosure, the obtaining an overload coefficient decrement step size includes:

processing the present effective value of the phase current by using a decrement step size calculation formula, to obtain the overload coefficient decrement step size; and wherein the decrement step size calculation formula is Kmin=A*(Ic/Ip)+B, Kmin is the overload coefficient decrement step size, Ic is the present effective value of the phase current, Ip is a rated output current, and A and B are constants.

According to an embodiment of the present disclosure, the performing limit processing on the updated overload coefficient to obtain an updated present overload coefficient includes:

obtaining an overload coefficient lower limit and an overload coefficient upper limit;

determining the overload coefficient lower limit as the updated present overload coefficient if the updated overload coefficient is less than the overload coefficient lower limit;

determining the overload coefficient upper limit as the updated present overload coefficient if the updated overload coefficient is greater than the overload coefficient upper limit; and determining the updated overload coefficient as the updated present overload coefficient if the updated overload coefficient is greater than or equal to the overload coefficient lower limit and the updated overload coefficient is less than or equal to the overload coefficient upper limit.

A motor controller includes a memory, a processor, and a computer program that is stored in the memory. When the processor executes the computer program to implement the foregoing motor overload protection method.

A vehicle includes a motor and the foregoing motor controller.

A non-transitory computer-readable storage medium stores a computer program. When the computer program is executed by a processor, the foregoing motor overload protection method is implemented.

Details of one or more embodiments of the present disclosure are provided in accompany drawings and descriptions below. Other features and advantages of the present disclosure become obvious with reference to the specification, the accompanying drawings, and the claims.

BRIEF DESCRIPTION OF THE DRAWINGS

To describe the technical solutions in embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may derive other drawings from these accompanying drawings without creative efforts.

FIG. 1 is a flowchart of a motor overload protection method according to an embodiment of the present disclosure;

FIG. 2 is another flowchart of a motor overload protection method according to an embodiment of the present disclosure;

FIG. 3 is another flowchart of a motor overload protection method according to an embodiment of the present disclosure;

FIG. 4 is another flowchart of a motor overload protection method according to an embodiment of the present disclosure;

FIG. 5 is another flowchart of a motor overload protection method according to an embodiment of the present disclosure;

DETAILED DESCRIPTION

Figures 6, 7:
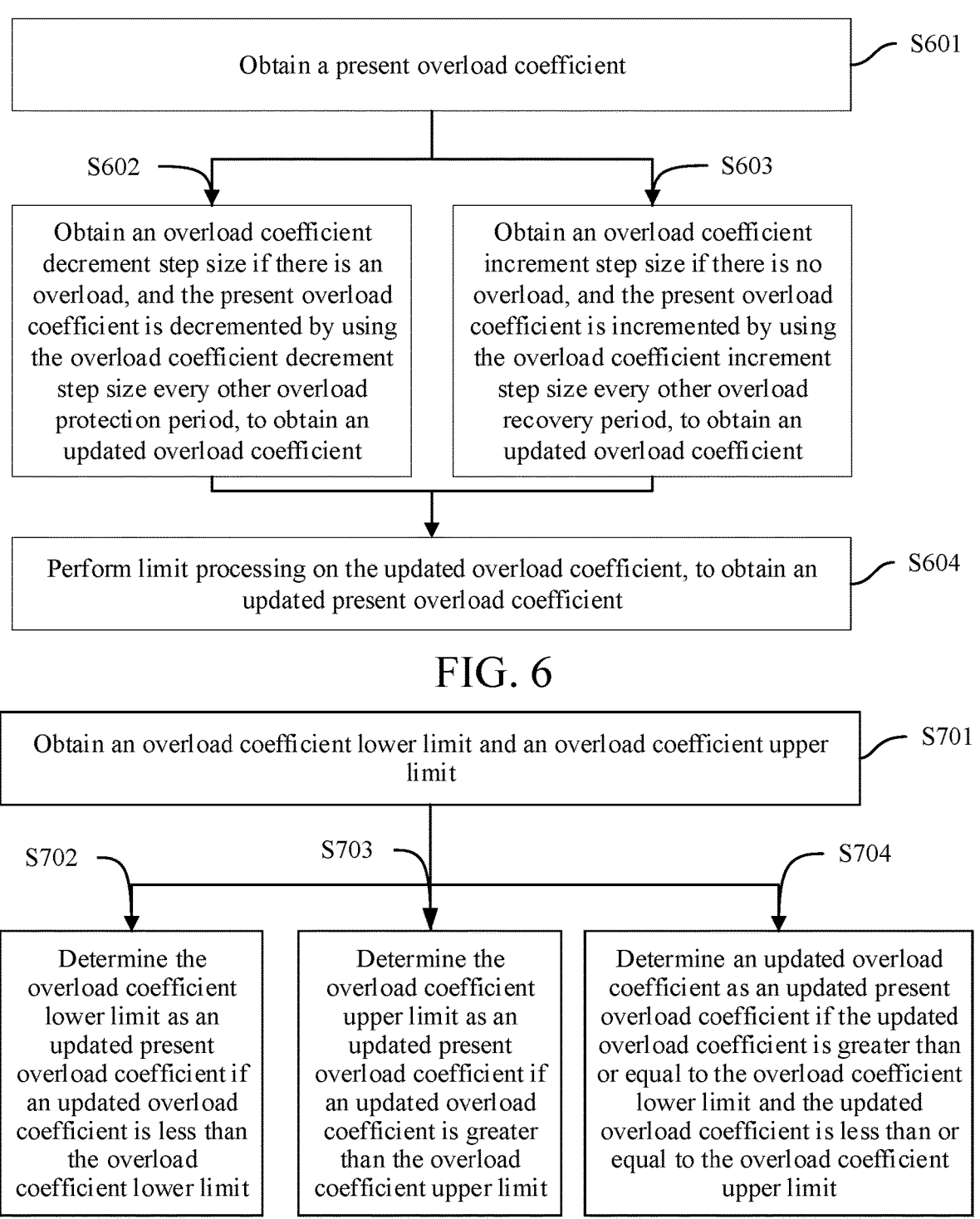
FIG. 6 is another flowchart of a motor overload protection method according to an embodiment of the present disclosure.
FIG. 7 is another flowchart of a motor overload protection method according to an embodiment of the present disclosure.

In the first solution in the background, only the temperature limit is considered for the overload protection, and other factors such as a current or power of a motor controller are not considered for the overload protection, easily causing the motor driving system to run at large power for a long time or operate in a large current due to an uneven current and other hardware abnormality, causing damage to an IGBT module or another module inside the motor controller. In the second solution, only the power is considered for the overload protection, easily causing a misjudgment due to a deviation in power calculation based on violent fluctuation of a rotation speed during an acceleration or speed transition stage of a vehicle, triggering the overload protection and causing power interruption. There is a great travelling safety risk, which even threatens life safety of a driver.

The following clearly and completely describes the technical solutions in the embodiments of the present disclosure with reference to the accompanying drawings in the embodiments of the present disclosure. Apparently, the described embodiments are some embodiments of the present disclosure rather than all of the embodiments. All other embodiments obtained by a person of ordinary skill in the art based on the embodiments of the present disclosure without creative efforts shall fall within the protection scope of the present disclosure.

The embodiments of the present disclosure provide a motor overload protection method. The motor overload protection method may be applied to a motor controller of a vehicle. Overload protection may be performed according to an actual current acquired during operation of a motor, to implement effective protection for a motor driving system, which can avoid damage to an internal device of the motor controller, and can also effectively prevent incorrectly triggering overload protection due to an overload misjudgment and affecting normal driving of the vehicle.

In an embodiment, as shown in FIG. 1, a motor overload protection method is provided. An example in which the method is applied to a motor controller is used for description. The method includes the following steps.

S101: A present effective value of the phase current of a motor is acquired.

S102: Time integration is performed on the present effective value of the phase current, to obtain a first integral value.

S103: A first threshold is obtained.

S104: Overload detection is performed according to the first threshold and the first integral value.

S105: A target limiting current for operation of the motor is determined if an overload occurs, and the operation of the motor is controlled based on the target limiting current.

The present effective value of the phase current is an effective value of the phase current that is acquired and calculated in real time.

As an example, in step S101, the motor controller may acquire three motor three-phase currents corresponding to the motor, and perform average calculation on the three motor three-phase currents, to acquire the present effective value of the phase current. The motor three-phase current is a current that passes through three wires. Each wire is used as a loop for the other two wires, and phase differences of three components of the motor three-phase current are successively one third of a period or a phase angle of 120°. The motor controller may also acquire a motor current peak value in real time, and calculate and determine the present effective value of the phase current according to the motor current peak value, for example, by dividing the motor current peak value by $\sqrt{2}$.

As an example, in step S102, after the motor controller acquires the present effective value of the phase current corresponding to a system present moment, time integration may be performed on the present effective value of the phase currents within a specific time period before the system present moment, to obtain the first integral value. The first integral value is a current-time integration value calculated in real time at the system present moment. For example, if the system present moment is T1, and the specific time period is ΔT, time integration is performed on the present effective value of the phase currents acquired within such a specific time period [T1−ΔT, T1], to calculate the first integral value in real time. The first integral value may effectively reflect an overload level of the motor within the specific time period.

The first threshold may be a preset threshold for evaluating whether an overload determination condition is determined to be satisfied.

As an example, in step S103, after obtaining the first integral value, the motor controller may query a current-time integration threshold table based on the present effective value of the phase current to obtain a second threshold corresponding to the present effective value of the phase current from the current-time integration threshold table, and may determine the second threshold as the first threshold for performing overload detection; or may correct the second threshold according to an actual driving operating condition of a vehicle, to obtain the first threshold.

The current-time integration threshold table is a prestored data table for reflecting correspondences between different output currents and a specific threshold. The second threshold can be directly determined by querying the current-time integration threshold table according to the present effective value of the phase current. The first threshold is determined by using the second threshold directly or correcting the second threshold. It may be understood that, because the current-time integration threshold table is a data table prestored in an in-vehicle memory, a table lookup operation may be performed according to the present effective value of the phase current, to quickly determine the first threshold.

As an example, in step S104, after obtaining the first integral value and the first threshold, the motor controller invokes an overload detection program generated based on the overload determination condition, uses the first integral value and the first threshold as input parameters of the overload detection program, and executes the overload detection program. The motor controller can then determine whether the first integral value and the first threshold satisfy the overload determination condition, to detect motor overload according to the first threshold and the first integral value. The overload determination condition may be a preset determination condition for evaluating whether the motor is overloaded. The overload detection program is a computer program complied based on the overload determination condition. An overload detection result is a detection result for detecting whether the first integral value and the first threshold satisfy the overload determination condition. In some embodiments, overload detection results includes that an overload occurs and that no overload occurs. Herein that an overload occurs is a detection result that the motor is overloaded, which is deduced according to the first integral value and the first threshold; and correspondingly, that no overload occurs is a detection result that the motor is not overloaded, which is deduced according to the first integral value and the first threshold.

It may be understood that, the first threshold may be quickly and accurately determined by querying the current-time integration threshold table determined through a bench test. The first threshold is a value determined according to an overload capacity of the motor determined according to the bench test. Using the first threshold to perform overload detection on the first integral value ensures accuracy of overload detection and may effectively avoid errors in overload detection, thereby avoiding a travelling safety risk of power interruption due to the errors.

The target limiting current is a current less than the present effective value of the phase current, but can maintain normal operation of the motor.

As an example, in step S105, when the overload detection result is that an overload occurs, the motor controller is configured to determine the target limiting current for the operation of the motor and control the operation of the motor based on the target limiting current. Because the target limiting current is the current less than the present effective value of the phase current, but can maintain the normal operation of the motor, the motor controller may control, based on the target limiting current, the motor to operate at reduced power. In this way, an objective for overload protection can be achieved and a current for maintaining normal rotation of the motor can be provided, so that the vehicle can operate normally, and vehicle power interruption or another abnormal operating condition due to triggering of overload protection is avoided, thereby ensuring vehicle travelling safety.

In this example, during performing an overload protection policy, the motor controller is configured to determine at least two overload protection periods, each overload protection period corresponds to one target limiting current, and there is a gradual decrease between target limiting currents corresponding to the at least two overload protection periods, to implement that the operation of the motor is driven based on the target limiting current in each overload protection period, to implement that the target limiting current is gradually decreased when the motor is overloaded, and avoid instantaneous vehicle power interruption or another abnormal operating condition on the premise of implementing overload protection, thereby ensuring vehicle travelling safety; and the target limiting current is gradually decreased in the at least two overload protection periods, to implement insensible power consumption reduction when the motor is overloaded, which helps to improve vehicle driving experience. The overload protection period is a preset period for implementing overload protection.

As an example, after step S104, that is, after overload detection is performed on the first integral value by using the first threshold to obtain the overload detection result, the motor overload protection method further includes that if the overload detection result is that no overload occurs, the operation of the motor is controlled based on the present effective value of the phase current.

In this example, when the overload detection result is that no overload occurs, the motor controller may continue to control the operation of the motor based on the present effective value of the phase current, to ensure that the vehicle can operate normally and an internal component of the motor controller is not damaged due to an overload.

In this embodiment, the first integral value is quickly and accurately determined according to the present effective value of the phase current, and the first integral value may accurately reflect a present overload level of the motor; and overload detection is performed on the first integral value by using the first threshold again, to implement determining whether an overload occurs based on the present overload level of the motor, which helps to ensure accuracy and efficiency of overload detection. When the overload detection determines that an overload occurs, the motor controller is configured to operate according to the target limiting current, to implement power consumption reduction for driving the operation of the motor, which may avoid device damage caused by the overload and improve service life of the motor controller; and may provide a current for maintaining normal rotation of the motor, so that the vehicle can operate normally, to ensure travelling safety.

In an embodiment, as shown in FIG. 2, in step S103, the first threshold is obtained by the following steps:

S201: A current-time integration threshold table is queried according to the present effective value of the phase current, to obtain a second threshold.

S202: A present current frequency is obtained, and the present current frequency is compared with a current frequency threshold.

S203: The second threshold is corrected according to a target correction coefficient to obtain the first threshold if the present current frequency is less than the current frequency threshold.

S204: The second threshold is determined as the first threshold if the present current frequency is greater than or equal to the current frequency threshold.

As an example, in step S201, after obtaining the present effective value of the phase current, the motor controller may query the current-time integration threshold table based on the present effective value of the phase current, to obtain the second threshold corresponding to the present effective value of the phase current from the current-time integration threshold table. The second threshold is a current-time integration value determined by looking up the table, which is an efficient way of obtaining the second threshold.

The present current frequency is a current frequency at a system present moment, namely, a conversion frequency of an electromagnetic field at the system present moment. For example, a quantity of conversions of an alternating current within 1 s. The current frequency threshold is a preset threshold for evaluating whether a current frequency satisfies a correction requirement. Generally, the current frequency threshold is a preset threshold related to the current frequency, and specifically, is a threshold related to the current frequency when the motor is determined by pretesting in a locked-rotor operating condition, for ease of subsequent evaluating, based on the present current frequency, whether the motor is in the locked-rotor operating condition.

As an example, in step S202, the motor controller may obtain the present current frequency acquired at the system present moment, query an in-vehicle memory to obtain the prestored current frequency threshold, and compare the present current frequency with the current frequency threshold, for determining, according to a comparison result, whether the second threshold needs to be corrected.

The target correction coefficient may be a preset correction coefficient.

As an example, in step S203, the motor controller compares the present current frequency with the current frequency threshold. When the present current frequency is less than the current frequency threshold, it indicates a high probability that the motor is in a locked-rotor operating condition. In this case, a load capacity of the motor is a maximum load capacity of the motor in the locked-rotor operating condition, which is much higher than a normal load capacity of the motor in a non-locked-rotor operating condition. The second threshold needs to be corrected to avoid performing the overload detection i based on a low second threshold and the maximum load capacity of the motor cannot be fully utilized.

In an embodiment, in step S203, the second threshold is corrected according to a target correction coefficient to obtain the first threshold. The step S203 includes that the second threshold is adjusted/corrected according to a threshold correction formula and with the target correction coefficient, to obtain the first threshold. The threshold correction formula is $V1=K*V2$, V1 is the first threshold, V2 is the second threshold, K is the target correction coefficient, and $K>1$.

In this example, the motor controller may adjust/correct the second threshold by using the target correction coefficient that may be preset and is greater than 1. The motor controller may determine a product of the second threshold and the target correction coefficient as the first threshold, so that the first threshold is greater than the second threshold obtained from the lookup table, and the maximum load capacity of the motor may be more fully utilized for overload security, to enable the motor to make full use of an overload capacity of the motor in the locked-rotor operating condition.

As an example, in step S204, the motor controller compares the present current frequency with the current frequency threshold. When the present current frequency is greater than or equal to the current frequency threshold, it indicates a low probability that the motor is in the locked-rotor operating condition. In this case, the load capacity of the motor is the normal load capacity of the motor in the non-locked-rotor operating condition. There is no need to correct the second threshold, so that the second threshold may be directly determined as the first threshold.

In this embodiment, when the acquired present current frequency is less than the current frequency threshold, the second threshold is corrected by using a target correction coefficient greater than 1, to obtain the first threshold, reduce a case in which it is determined that an overload occurs, make full use of the overload capacity of the motor when the current frequency is low, and simultaneously implement overload protection for the locked-rotor operating condition in which the present current frequency is less than the current frequency threshold, which may avoid a risk of motor damage. When the acquired present current frequency is greater than or equal to the current frequency threshold, the second threshold is directly determined as the first threshold, which helps to improve efficiency of obtaining the first threshold.

In an embodiment, before step S201, that is, before a current-time integration threshold table is queried according to the present effective value of the phase current, to obtain a second threshold, the motor overload protection method further includes following steps.

S001: A test output current and target operation duration corresponding to the test output current are obtained.

S002: A rated parameter corresponding to the test output current is determined based on a preset constant and the target operation duration.

S003: Time integration is performed on the rated parameter, to obtain a rated threshold corresponding to the test output current.

S004: The current-time integration threshold table is formed based on the test output current, the target operation duration, the rated parameter, and the rated threshold.

As an example, in step S001, before the motor controller performs overload protection control, hardware is configured to perform a bench test or simulation test in advance according to a thermal management cooling solution of the vehicle, and a test output current for each bench test or simulation test needs to be determined first, and may be represented by Is. The test output current herein is an output current determined during the bench test or simulation test. For example, during the bench test or simulation test, if the motor is in a normal operation state, the test output current thereof=a rated output current, that is, Is=Ip. The rated output current is a current of the motor operating at a rated voltage according to rated power, and may be represented by Ip. For another example, during the bench test or simulation test, if the motor is in an overload recovery state, the test output current thereof=the rated output current−a first change threshold, that is, Is=Ip—ΔI1. The first change threshold ΔI1 herein is a preset threshold applicable during overload recovery. For another example, during the bench test or simulation test, if the motor is in an overload protection state, the test output current thereof=the rated output current+a second change threshold, that is, Is=Ip+ΔI2. The second change threshold ΔI2 herein is a preset threshold applicable during overload protection.

In this example, after different test output currents are determined, the target operation duration corresponding to the test output current needs to be determined through the bench test or simulation test according to an operation state of the motor during the bench test or simulation test, and may be represented by T_Run. For example, during the bench test or simulation test, if the motor is in the overload recovery state, the target operation duration corresponding to the test output current is operating duration of the motor operating from the test output current to the rated output current. For another example, during the bench test or simulation test, if the motor is in the normal operation state or the overload recovery state, the target operation duration corresponding to the test output current is operating duration of the motor operating from the rated output current to a maximum overload current. The maximum overload current is a maximum current loadable by the motor. Specifically, the maximum overload current may be calculated by performing the bench test on motor hardware and using hardware parameters such as a three-phase line and a power module of the motor, and may be represented by Imax.

The preset constant is a constant that is preset, and for example, may be represented by K_OverCoef.

As an example, in step S002, after target operation duration corresponding to each test output current is determined, the rated parameter corresponding to the test output current may be determined based on the preset constant K_OverCoef and the target operation duration T_Run, which specifically includes that a quotient value of the preset constant K_OverCoef and the target operation duration T_Run is calculated; if the quotient value is less than or equal to 0, the rated parameter corresponding to the test output current is set to 0; and if the quotient value is greater than 0, the quotient value is determined as the rated parameter corresponding to the test output current.

As an example, in step S003, after the rated parameter corresponding to each test output current is determined, time integration may be performed on the rated parameter corresponding to the test output current, to determine the rated threshold corresponding to the test output current. The rated threshold may be understood as a threshold for evaluating whether the overload determination condition is determined to be satisfied in the test output current.

As an example, in step S004, the current-time integration threshold table may be formed based on the test output current, the target operation duration, and the rated parameter, and the current-time integration threshold table is encoded in the motor controller by using software, so that the motor controller may query the current-time integration threshold table and determine the corresponding second threshold during performing overload protection, to determine that the second threshold may be quickly obtained by querying the current-time integration threshold table according to the present effective value of the phase current.

For example, the current-time integration threshold table is shown in Table 1. When the motor is in the overload recovery state, the test output current Is thereof is less than the rated output current Ip, and the target operation duration thereof is a negative value; when the motor is in the normal operation state or the overload protection state, the test output current Is thereof is equal to or greater than the rated output current Ip, and the target operation duration thereof is a positive value; the rated parameter Kp corresponding to the test output current Is is the rated output current Ip; and the rated threshold is an integral of the rated parameter Kp and may be determined by using an integral calculation formula.

TABLE 1

| | | Current-time integration threshold table | | |
| --- | --- | --- | --- |
| Test output current Is | Target operation duration T_Run | Rated parameter Kp | Rated threshold |
| Ip − ΔI1 | −T_Run1 | Kp1 = K_OverCoef/−T_Run1 | Integral of Kp1 |
| Ip | T_Run2 | Kp2 = K_OverCoef/T_Run2 | Integral of Kp2 |
| Ip + ΔI2 | T_Run3 | Kp3 = K_OverCoef/T_Run3 | Integral of Kp3 |
| . . . | . . . | . . . | |
| Imax | T_Runx | Kpx = K_OverCoef/T_Runx | Integral of Kpx |

In an embodiment, as shown in FIG. 3, in step S103, that a first threshold is obtained includes the following steps.

S301: A current-time integration threshold table is queried according to the present effective value of the phase current, to obtain a second threshold.

S302: A present motor rotation speed is obtained, and the present motor rotation speed is compared with an overload rotation speed threshold.

S303: An overload integral gain threshold is obtained if the present motor rotation speed is less than the overload rotation speed threshold, and the first threshold is obtained according to the second threshold and the overload integral gain threshold.

S304: The second threshold is determined as the first threshold if the present motor rotation speed is greater than or equal to the overload rotation speed threshold.

As an example, in step S301, after obtaining the present effective value of the phase current, the motor controller may query the current-time integration threshold table based on the present effective value of the phase current, to obtain the second threshold corresponding to the present effective value of the phase current from the current-time integration threshold table. The second threshold is a current-time integration value directly determined by looking up the table, which ensures efficiency of obtaining the second threshold.

The present motor rotation speed is a motor rotation speed at a system present moment. The overload rotation speed threshold is a preset rotation speed threshold for evaluating whether a motor rotation speed is determined to reach a locked-rotor operating condition. Generally, the overload rotation speed threshold is a threshold determined by determining a motor rotation speed of the motor in the locked-rotor operating condition by pre-testing, for ease of subsequent evaluating whether the motor is in the locked-rotor operating condition based on the present motor rotation speed.

As an example, in step S302, the motor controller may obtain the present motor rotation speed acquired at the system present moment, query an in-vehicle memory to obtain the prestored overload rotation speed threshold, and compare the present motor rotation speed with the overload rotation speed threshold, for ease of determining, according to a comparison result, whether the second threshold can be directly determined as the first threshold.

The overload integral gain threshold is a preset threshold of an integral gain.

As an example, in step S303, the motor controller compares the present motor rotation speed with the overload rotation speed threshold. When the present motor rotation speed is less than the overload rotation speed threshold, it indicates that the motor rotation speed is low and a probability of being in the locked-rotor operating condition is high. In this case, a load capacity of the motor is a maximum load capacity in the locked-rotor operating condition, which is much higher than a normal load capacity of the motor in a non-locked-rotor operating condition. If the second threshold obtained by querying the current-time integration threshold table is directly determined as the first threshold, overload detection may be performed subsequently based on a low first threshold and the maximum load capacity of the motor cannot be fully utilized. Therefore, when the present motor rotation speed is less than the overload rotation speed threshold, the motor controller may query the in-vehicle memory, read the second threshold and the overload integral gain threshold from the in-vehicle memory, and determine the first threshold according to a product of the second threshold and the overload integral gain threshold. In this way, the maximum load capacity of the motor can be fully utilized for overload security, so that the motor can operate with the maximum load capacity in the locked-rotor operating condition. It may be understood that, the second threshold and the overload integral gain threshold are thresholds determined for operation in the maximum load capacity of the motor by pre-testing when the motor is intended to be in the locked-rotor operating condition.

As an example, in step S304, the motor controller compares the present motor rotation speed with the overload rotation speed threshold. When the present motor rotation speed is greater than or equal to the overload rotation speed threshold, it indicates the motor rotation speed is high and a probability of being in the locked-rotor operating condition is low. In this case, the load capacity of the motor is the normal load capacity of the motor in the non-locked-rotor operating condition. The second threshold corresponding to the present effective value of the phase current may be obtained from the current-time integration threshold table by querying the current-time integration threshold table based on the present effective value of the phase current. There is no need to correct the second threshold, and the second threshold is directly determined as the first threshold.

In this embodiment, when the present motor rotation speed is less than the overload rotation speed threshold, the first threshold may be determined according to the second threshold and the overload integral gain threshold, to implement overload protection for the locked-rotor operating condition in which the present current frequency is less than the current frequency threshold, and the maximum load capacity of the motor may be more fully utilized for overload security. When the present motor rotation speed is greater than or equal to the overload rotation speed threshold, the second threshold is directly determined as the first threshold, which helps to improve efficiency of obtaining the first threshold.

In an embodiment, as shown in FIG. 4, in step S104, overload detection is performed on the first integral value by using the first threshold to obtain the overload detection result. The step S104 includes the following steps.

S401: The first integral value is compared with the first threshold.

S402: That an overload occurs is determined if the first integral value is greater than first threshold.

S403: That no overload occurs is determined if the first integral value is less than or equal to the first threshold.

As an example, in step S401, after obtaining the first integral value and the first threshold, the motor controller compares the first integral value with the first threshold, to determine whether the overload determination condition is satisfied and obtain the overload detection result.

As an example, in step S402, the motor controller compares the first integral value with the first threshold. When the first integral value is greater than the first threshold, a motor load at the system present moment is determined to be high and exceeds the normal load capacity of the motor controller. Therefore, it is determined that an overload occurs.

As an example, in step S403, the motor controller compares the first integral value with the first threshold. When the first integral value is less than or equal to the first threshold, a motor load at the system present moment is determined to be low and does not reach a standard to be determined as satisfying the overload determination condition, that is, does not exceed the normal load capacity of the motor controller. Therefore, it is determined that no overload occurs.

In this embodiment, the first integral value obtained by looking up the table is compared with the prestored first threshold, to determine whether the first integral value reaches the overload determination condition and determine whether an overload occurs, so that an overload detection process may be implemented by less onerous operations including looking up the table and comparison, which are relatively simple and convenient, which helps to improve processing efficiency.

In an embodiment, as shown in FIG. 5, in step S105, a target limiting current for operation of the motor is determined. The step S105 includes the following steps.

S501: A present overload coefficient is obtained.

S502: The present effective value of the phase current is limited by using the present overload coefficient, to obtain the target limiting current.

The present overload coefficient is a coefficient determined at the system present moment for limiting the present effective value of the phase current.

As an example, in step S501, the motor controller may obtain the present overload coefficient prestored in the in-vehicle memory, to efficiently obtain the present overload coefficient. In some embodiments, the motor controller may also calculate and determine the present overload coefficient in real time according to an actual case of the vehicle, for example, by calculating and determining the present overload coefficient according to the present effective value of the phase current, to efficiently obtain the present overload coefficient.

As an example, in step S502, when it is determined that an overload occurs, the motor controller is configured to limit the present effective value of the phase current by using the present overload coefficient, so that the obtained target limiting current is less than the present effective value of the phase current, so that overload protection can be implemented when the operation of the motor is controlled based on the target limiting current.

In an embodiment, in step S502, the present effective value of the phase current is limited by using the present overload coefficient, to obtain the target limiting current. The step S502 includes that the present overload coefficient and the present effective value of the phase current are calculated by using a limiting current calculation formula, to obtain the target limiting current. The limiting current calculation formula is $It=(Ic*Kco)/R$, It is the target limiting current, Ic is the present effective value of the phase current, Kco is the present overload coefficient, and R is a constant. In this example, the constant R may be specifically an overload coefficient upper limit, for example, 1000.

In this example, in step S501, during performing an overload protection policy, the motor controller may determine at least two overload protection periods and obtain a present effective value of the phase current and a present overload coefficient that correspond to each overload protection period, and there is a gradual decrease between present overload coefficients corresponding to the at least two overload protection periods. When there is a gradual decrease between present overload coefficients corresponding to the at least two overload protection periods, a present overload coefficient corresponding to a latter overload protection period is less than a present overload coefficient corresponding to a former overload protection period. A target limiting current corresponding to each overload protection period may be an operating current default by a system, or may be a target limiting current corresponding to a previous overload protection period. Therefore, it may be learned that, a present effective value of the phase current corresponding to a next overload protection period is less than or equal to a present effective value of the phase current corresponding to the overload protection period. When a present overload coefficient corresponding to a latter overload protection period is less than a present overload coefficient corresponding to a former overload protection period, and a present effective value of the phase current corresponding to a next overload protection period is less than or equal to a present effective value of the phase current corresponding to the overload protection period, it may be determined that a target limiting current corresponding to the former overload protection period is less than a target limiting current corresponding to the latter overload protection period, to implement that the operation of the motor is driven based on the target limiting currents that correspond to the at least two overload protection periods and that gradually decrease. Gradually decreasing the target limiting currents corresponding to the at least two overload protection periods may avoid instantaneous vehicle power interruption or another abnormal operating condition on the premise of implementing overload protection, which helps to improve vehicle driving experience.

In this embodiment, the motor controller may use the present overload coefficient to obtain the target limiting current, so that when the operation of the motor is driven according to the target limiting current, linear smoothing of the present effective value of the phase current is implemented, which can maximum power performance of a motor driving system, so that in some special operating conditions (such as starting operating conditions or slope-case driving operating conditions), the motor controller can operate in an overload case. In this way, an internal device thereof is not damaged and a travelling safety risk caused by direct power interruption can also be avoided.

In an embodiment, as shown in FIG. 6, after step S104, that is, after that overload detection is performed according to the first threshold and the first integral value, the motor overload protection method further includes the following steps.

S601: A present overload coefficient is obtained.

S602: An overload coefficient decrement step size is obtained if an overload occurs, and the present overload coefficient is decremented by using the overload coefficient decrement step size every other overload protection period, to obtain an updated overload coefficient.

S603: An overload coefficient increment step size is obtained if no overload occurs, and the present overload coefficient is incremented by using the overload coefficient increment step size every other overload recovery period, to obtain an updated overload coefficient.

S604: Limit processing is performed on the updated overload coefficient to obtain an updated present overload coefficient.

A present overload coefficient Kco is an overload coefficient determined at the system present moment.

As an example, in step S601, the in-vehicle memory corresponding to the motor controller stores the present overload coefficient Kco updated in real time, so that when the overload detection result is that an overload occurs, the motor controller may limit the present effective value of the phase current by using the present overload coefficient, to ensure efficiency of obtaining the present overload coefficient.

The overload coefficient decrement step size is a step size for decrementing the present overload coefficient. The overload protection period is a preset period for updating the present overload coefficient when an overload occurs. That is to say, the present overload coefficient needs to be updated once every other overload protection period.

As an example, in step S602, when the overload detection result is that an overload occurs, an overload coefficient decrement step size Kmin may be obtained first, and an updated overload coefficient Kco1 is obtained by decrementing the present overload coefficient Kco by using the overload coefficient decrement step size Kmin every other overload protection period T1, in other words, a difference between the present overload coefficient Kco and the overload coefficient decrement step size Kmin is determined as the updated overload coefficient Kco1 every other overload protection period T1, in other words, Kco1=Kco−Kmin, to implement a gradual decrease of an overload coefficient when an overload occurs, for ease of subsequent implementation of a smooth decrease of the target limiting current, which avoids a travelling safety risk caused by instantaneous power interruption when the overload detection result is that an overload occurs. In this example, when a present overload coefficient is updated in each overload protection period, a target limiting current corresponding to the overload protection period may be updated based on the updated present overload coefficient, to implement a gradual decrease of the target limiting current within at least two overload protection periods and implement a gradual decrease of the target limiting current when the motor is overloaded, which helps to improve vehicle driving experience.

In an implementation, the overload coefficient decrement step size Kmin obtained by the motor controller may be a threshold preset by the system, or may be a value calculated in real time according to the present effective value of the phase current, which may ensure real-time performance of the overload coefficient decrement step size Kmin, and ensure real-time performance and accuracy of the present overload coefficient finally determined.

In an embodiment, step S602, namely, that an overload coefficient decrement step size is obtained, includes that the present effective value of the phase current is processed by using a decrement step size calculation formula, to obtain the overload coefficient decrement step size Kmin. The decrement step size calculation formula is Kmin=A*(Ic/Ip)+B, Kmin is the overload coefficient decrement step size, Ic is the present effective value of the phase current, Ip is a rated output current, and A and B are constants. It may be understood that, the overload coefficient decrement step size Kmin is calculated in real time according to the present effective value of the phase current, which may ensure real-time performance of the overload coefficient decrement step size Kmin and ensure real-time performance and accuracy of the present overload coefficient finally determined.

As an example, in step S603, when the overload detection result is that no overload occurs, an overload coefficient increment step size Kadd may be obtained first, and an updated overload coefficient Kco1 is obtained by incrementing the present overload coefficient Kco by using the overload coefficient increment step size Kadd every other overload recovery period T2, in other words, a sum of the present overload coefficient Kco and the overload coefficient increment step size Kadd is determined as the updated overload coefficient Kco1 every other overload recovery period T2, in other words, Kco1=Kco+Kadd, to implement a gradual increase of an overload coefficient when the overload detection result is that no overload occurs, and avoid a rapid increase of the present overload coefficient.

As an example, in step S604, after performing decrement or increment processing on the present overload coefficient Kco and determining the updated overload coefficient Kco1, the motor controller is configured to evaluate whether the updated overload coefficient Kco1 is within a preset overload coefficient threshold range; if the updated overload coefficient Kco1 is within the overload coefficient threshold range, the updated overload coefficient Kco1 may be directly determined as the updated present overload coefficient; and if the updated overload coefficient Kco1 is not within the overload coefficient threshold range, the updated present overload coefficient needs to be determined according to the overload coefficient threshold range, to ensure that the updated present overload coefficient is within a limited range, to ensure that when the present overload coefficient is subsequently used to limit the present effective value of the phase current, overload protection can be implemented and a travelling safety risk of power interruption can be avoided during overload protection.

In an embodiment, as shown in FIG. 7, in step S604, namely, limit processing is performed on the updated overload coefficient to obtain an updated present overload coefficient. The step S604 includes the following steps.

S701: An overload coefficient lower limit and an overload coefficient upper limit are obtained.

S702: The overload coefficient lower limit is determined as the updated present overload coefficient if the updated overload coefficient is less than the overload coefficient lower limit.

S703: The overload coefficient upper limit is determined as the updated present overload coefficient if the updated overload coefficient is greater than the overload coefficient upper limit.

S704: The updated overload coefficient is determined as the updated present overload coefficient if the updated overload coefficient is greater than or equal to the overload coefficient lower limit and the updated overload coefficient is less than or equal to the overload coefficient upper limit.

The overload coefficient lower limit is a preset minimum value of an overload coefficient, for example, the overload coefficient lower limit may be set to 0. The overload coefficient upper limit is a preset maximum value of an overload coefficient, for example, the overload coefficient upper limit may be set to 1000. The overload coefficient upper limit may determine a current decrease value decreasing from the present effective value of the phase current to the target limiting current in each overload protection period, to determine a threshold for a current decrease amplitude.

As an example, in step S701, the motor controller may read and obtain the overload coefficient lower limit and the overload coefficient upper limit from the in-vehicle memory, for ease of using the overload coefficient lower limit and the overload coefficient upper limit to perform limit processing on the updated overload coefficient obtained in real time, to ensure that the present overload coefficient finally obtained is within a reasonable range, thereby ensuring that when the present overload coefficient is subsequently used to limit the present effective value of the phase current, overload protection can be implemented and a travelling safety risk of power interruption caused by a misjudgment can be avoided during overload protection.

As an example, in step S702, the motor controller may compare the updated overload coefficient with the overload coefficient lower limit, and if the updated overload coefficient is less than the overload coefficient lower limit, the updated overload coefficient is determined to be lower than an allowed minimum value of an overload coefficient. In this case, the overload coefficient lower limit may be determined as the updated present overload coefficient, and step S602 is no longer performed. A processing operation of decrementing the present overload coefficient by using the overload coefficient decrement step size every other overload protection period to obtain an updated overload coefficient is no longer performed, to reduce resources occupied during processing.

As an example, in step S703, the motor controller may compare the updated overload coefficient with the overload coefficient upper limit, and if the updated overload coefficient is greater than the overload coefficient upper limit, the updated overload coefficient is determined to be higher than an allowed maximum value of an overload coefficient. In this case, the overload coefficient upper limit may be determined as the updated present overload coefficient, and step S603 is no longer performed. A processing operation of incrementing the present overload coefficient by using the overload coefficient increment step size every other overload recovery period to obtain an updated overload coefficient is no longer performed, to reduce resources occupied during processing.

As an example, in step S704, the motor controller may compare the updated overload coefficient with the overload coefficient lower limit and the overload coefficient upper limit, and if the updated overload coefficient is between the overload coefficient lower limit and the overload coefficient upper limit, the updated overload coefficient is determined to be within a preset reasonable range. Therefore, the updated overload coefficient may be directly determined as the updated present overload coefficient, to ensure that when the updated present overload coefficient is subsequently used to limit the present effective value of the phase current, overload protection can be implemented and a travelling safety risk of power interruption caused by a misjudgment can be avoided during overload protection. It may be understood that, after the updated overload coefficient is determined as the updated present overload coefficient, step S602 or step S603 needs to be continuously performed until the obtained updated overload coefficient is the overload coefficient lower limit or the overload coefficient upper limit.

In an embodiment, before step S101, that is, before that the motor three-phase current is obtained, the motor overload protection method further includes that a present state of an IGBT module is detected, initialization configuration is performed when the present state is a turned-on state, and the overload coefficient upper limit is configured as the present overload coefficient.

The IGBT module is a power module configured in the motor controller. The present state is a state reflecting whether the IGBT module is turned on, and the present state includes the turned-on state and a cut-off state.

In this example, the motor controller is configured to detect the present state of the IGBT module thereof in real time, and perform initialization configuration when the present state is the turned-on state, to configure the overload coefficient upper limit as the present overload coefficient, so that when the IGBT module is turned on. When an overload occurs, overload protection may be performed in time. It may be understood that, during initialization configuration, the overload protection period and the overload recovery period may be cleared to prevent information cached before the IGBT module is turned on from affecting accuracy of overload protection control.

It is to be understood that, sequence numbers of the foregoing embodiments do not indicate an execution sequence, and an execution sequence of processes shall be determined based on functions and internal logic thereof, and shall constitute no limitation on an implementation process of the embodiments of the present disclosure.

Figure 8:
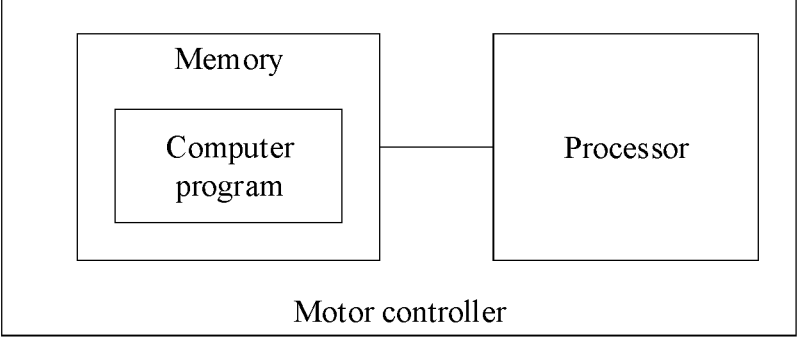
FIG. 8 is a schematic diagram of a motor controller according to an embodiment of the present disclosure.

In an embodiment, a motor controller is provided. As shown in FIG. 8, the motor controller includes a memory, a processor, and a computer program that is stored in the memory and that is executable by the processor. When the processor executes the computer program, the motor overload protection method, for example, shown in S101 to S105 in FIG. 1, or shown in FIG. 2 to FIG. 7, in the foregoing embodiments is implemented. Details are not described herein again to avoid repetition.

In an embodiment, a vehicle includes motor and the motor controller in the foregoing embodiment. Details are not described herein again to avoid repetition.

In an embodiment, a non-transitory computer-readable storage medium is provided. The computer-readable storage medium stores a computer program. When the computer program is executed by a processor, the motor overload protection method, for example, shown in S101 to S105 in FIG. 1, or shown in FIG. 2 to FIG. 7, in the foregoing embodiments is implemented. Details are not described herein again to avoid repetition.

A person of ordinary skill in the art may understand that all or some of procedures of the method in the foregoing embodiments may be implemented by a computer program instructing relevant hardware. The computer program may be stored in a non-transitory computer-readable storage medium. When the computer program is executed, the procedures of the foregoing method embodiments may be implemented. References to the memory, the storage, the database, or another medium used in the embodiments provided in the present disclosure may all include a non-transitory memory and/or a transitory memory. The non-transitory memory may include a read-only memory (ROM), a programmable ROM (PROM), an electrically programmable ROM (EPROM), an electrically erasable programmable ROM (EEPROM), or a flash memory. The transitory memory may include a random access memory (RAM) or an external high-speed cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ES-DRAM), a synchronization link (Synchlink) DRAM (SL-DRAM), a rambus (Rambus) direct RAM (RDRAM), a direct rambus dynamic RAM (DRDRAM), and a rambus dynamic RAM (RDRAM).

A person skilled in the art may clearly understand that, for the purpose of convenient and brief description, only division of the foregoing function units is used as an example for description. In the practical application, the functions may be allocated to and completed by different function modules according to requirements. That is, an internal structure of the device is divided into different functional units or modules, to complete all or some of the functions described above.

The foregoing embodiments are merely intended for describing the technical solutions of the present disclosure, but not for limiting the present disclosure. It should be understood by a person of ordinary skill in the art that although the present disclosure has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the technical solutions of the embodiments of the present disclosure, which shall fall within the protection scope of the present disclosure.

What is claimed is:

1. A method for protecting a motor from overloading, comprising:

acquiring a present effective value of a phase current of the motor;

performing time integration on the present effective value of the phase current, to obtain a first integral value;

obtaining a first threshold;

performing overload detection according to the first threshold and the first integral value;

obtaining a present overload coefficient;

performing one of:

if an overload occurs, obtaining an overload coefficient decrement step size, determining a target limiting current for operation of the motor, and decrementing the present overload coefficient by using the overload coefficient decrement step size, to obtain an updated overload coefficient; or if no overload occurs, obtaining an overload coefficient increment step size, and incrementing the present overload coefficient by using the overload coefficient increment step size, to obtain an updated overload coefficient;

performing limit processing on the updated overload coefficient, to obtain an updated present overload coefficient; and controlling the operation of the motor based on the target limiting current.

2. The method according to claim 1, wherein the obtaining a first threshold comprises:

querying a current-time integration threshold table according to the present effective value of the phase current, to obtain a second threshold;

obtaining a present current frequency, and comparing the present current frequency with a current frequency threshold;

correcting the second threshold according to a target correction coefficient to obtain the first threshold if the present current frequency is less than the current frequency threshold; and determining the second threshold as the first threshold if the present current frequency is greater than or equal to the current frequency threshold.

3. The method according to claim 2, wherein the correcting the second threshold according to a target correction coefficient to obtain the first threshold comprises:

processing the second threshold by a threshold correction formula and with the target correction coefficient, to obtain the first threshold, wherein the threshold correction formula is $V1=K*V2$, V1 is the first threshold, V2 is the second threshold, and K is the target correction coefficient.

4. The method according to claim 2, before the querying a current-time integration threshold table according to the present effective value of the phase current, to obtain a second threshold, the method further comprising:

obtaining a test output current and a target operation duration corresponding to the test output current;

determining a rated parameter corresponding to the test output current based on a constant and the target operation duration;

performing time integration on the rated parameter, to obtain a rated threshold corresponding to the test output current; and forming the current-time integration threshold table based on the test output current, the target operation duration, the rated parameter, and the rated threshold.

5. The method according to claim 1, wherein the obtaining a first threshold comprises:

querying a current-time integration threshold table according to the present effective value of the phase current, to obtain a second threshold;

obtaining a present motor rotation speed, and comparing the present motor rotation speed with an overload rotation speed threshold;

obtaining an overload integral gain threshold if the present motor rotation speed is less than the overload rotation speed threshold, and obtaining the first threshold according to the second threshold and the overload integral gain threshold; and determining the second threshold as the first threshold if the present motor rotation speed is greater than or equal to the overload rotation speed threshold.

6. The method according to claim 1, wherein the performing overload detection according to the first threshold and the first integral value comprises:

comparing the first integral value with the first threshold;

determining that an overload occurs if the first integral value is greater than the first threshold; and determining that no overload occurs if the first integral value is less than or equal to the first threshold.

7. The method according to claim 1, wherein the determining a target limiting current for operation of the motor comprises:

limiting the present effective value of the phase current by using the present overload coefficient, to obtain the target limiting current.

8. The method according to claim 7, wherein the limiting the present effective value of the phase current by using the present overload coefficient, to obtain the target limiting current comprises:

calculating the present overload coefficient and the present effective value of the phase current by using a limiting current calculation formula, to obtain the target limiting current, wherein the limiting current calculation formula is $It=(Ic*Kco)/R$, It is the target limiting current, Ic is the present effective value of the phase current, Kco is the present overload coefficient, and R is a constant.

9. The method according to claim 1, wherein the obtaining an overload coefficient decrement step size comprises:

processing the present effective value of the phase current by using a decrement step size calculation formula, to obtain the overload coefficient decrement step size, wherein the decrement step size calculation formula is that Kmin=A*(Ic/Ip)+B, Kmin is the overload coefficient decrement step size, Ic is the present effective value of the phase current, Ip is a rated output current, and A and B are constants.

10. The method according to claim 1, wherein the performing limit processing on the updated overload coefficient to obtain an updated present overload coefficient comprises:

obtaining an overload coefficient lower limit and an overload coefficient upper limit;

determining the overload coefficient lower limit as the updated present overload coefficient if the updated overload coefficient is less than the overload coefficient lower limit;

determining the overload coefficient upper limit as the updated present overload coefficient if the updated overload coefficient is greater than the overload coefficient upper limit; and determining the updated overload coefficient as the updated present overload coefficient if the updated overload coefficient is greater than or equal to the overload coefficient lower limit and the updated overload coefficient is less than or equal to the overload coefficient upper limit.

11. A motor controller, comprising a memory, a processor, and a computer program stored in the memory, wherein the processor is configured to execute the computer program to perform operations comprising:

acquiring a present effective value of a phase current of a motor;

performing time integration on the present effective value of the phase current, to obtain a first integral value;

obtaining a first threshold;

performing overload detection according to the first threshold and the first integral value;

obtaining a present overload coefficient;

performing one of:

if an overload occurs, obtaining an overload coefficient decrement step size, determining a target limiting current for operation of the motor, and decrementing the present overload coefficient by using the overload coefficient decrement step size, to obtain an updated overload coefficient; or if no overload occurs, obtaining an overload coefficient increment step size, and incrementing the present overload coefficient by using the overload coefficient increment step size, to obtain an updated overload coefficient;

performing limit processing on the updated overload coefficient, to obtain an updated present overload coefficient; and controlling the operation of the motor based on the target limiting current.

12. The motor controller according to claim 11, wherein the obtaining a first threshold comprises:

querying a current-time integration threshold table according to the present effective value of the phase current, to obtain a second threshold;

obtaining a present current frequency, and comparing the present current frequency with a current frequency threshold;

correcting the second threshold according to a target correction coefficient to obtain the first threshold if the present current frequency is less than the current frequency threshold; and determining the second threshold as the first threshold if the present current frequency is greater than or equal to the current frequency threshold.

13. The motor controller according to claim 12, wherein the correcting the second threshold according to a target correction coefficient to obtain the first threshold comprises:

processing the second threshold by a threshold correction formula and with the target correction coefficient, to obtain the first threshold, wherein the threshold correction formula is V1=K*V2, V1 is the first threshold, V2 is the second threshold, and K is the target correction coefficient.

14. The motor controller according to claim 12, before the querying a current-time integration threshold table according to the present effective value of the phase current, to obtain a second threshold, the operations further comprising:

obtaining a test output current and a target operation duration corresponding to the test output current;

determining a rated parameter corresponding to the test output current based on a constant and the target operation duration;

performing time integration on the rated parameter, to obtain a rated threshold corresponding to the test output current; and forming the current-time integration threshold table based on the test output current, the target operation duration, the rated parameter, and the rated threshold.

15. The motor controller according to claim 11, wherein the obtaining a first threshold comprises:

querying a current-time integration threshold table according to the present effective value of the phase current, to obtain a second threshold;

obtaining a present motor rotation speed, and comparing the present motor rotation speed with an overload rotation speed threshold;

obtaining an overload integral gain threshold if the present motor rotation speed is less than the overload rotation speed threshold, and obtaining the first threshold according to the second threshold and the overload integral gain threshold; and determining the second threshold as the first threshold if the present motor rotation speed is greater than or equal to the overload rotation speed threshold.

16. The motor controller according to claim 11, wherein the performing overload detection according to the first threshold and the first integral value comprises:

comparing the first integral value with the first threshold;

determining that an overload occurs if the first integral value is greater than the first threshold; and determining that no overload occurs if the first integral value is less than or equal to the first threshold.

17. The motor controller according to claim 11, wherein the determining a target limiting current for operation of the motor comprises:

limiting the present effective value of the phase current by using the present overload coefficient, to obtain the target limiting current.

18. A vehicle, comprising a motor and the motor controller according to claim 11.

19. A non-transitory computer-readable storage medium storing a computer program, wherein the computer program, when executed by a processor, causes the processor to perform operations comprising:

acquiring a present effective value of a phase current of a motor;

performing time integration on the present effective value of the phase current, to obtain a first integral value;

obtaining a first threshold;

performing overload detection according to the first threshold and the first integral value;

obtaining a present overload coefficient;

performing one of:

if an overload occurs, obtaining an overload coefficient decrement step size, determining a target limiting current for operation of the motor, and decrementing the present overload coefficient by using the overload coefficient decrement step size, to obtain an updated overload coefficient; or if no overload occurs, obtaining an overload coefficient increment step size, and incrementing the present overload coefficient by using the overload coefficient increment step size, to obtain an updated overload coefficient;

performing limit processing on the updated overload coefficient, to obtain an updated present overload coefficient; and controlling the operation of the motor based on the target limiting current.

* * * * *